US011012829B1

(12) United States Patent
Petri et al.

(10) Patent No.: US 11,012,829 B1
(45) Date of Patent: May 18, 2021

(54) PEER TO PEER PROPAGATION OF INFORMATION IN SOCIAL NETWORKS

(71) Applicant: International Business Machines Corporation, Armonk, NY (US)

(72) Inventors: John E. Petri, St. Charles, MN (US); Gregory Andrews, Rochester, MN (US); David Stanich, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/746,730

(22) Filed: Jan. 17, 2020

(51) Int. Cl.
*H04W 4/21* (2018.01)
*H04W 4/02* (2018.01)
*H04W 4/021* (2018.01)
*H04W 4/80* (2018.01)
*H04W 84/18* (2009.01)

(52) U.S. Cl.
CPC .............. *H04W 4/21* (2018.02); *H04W 4/021* (2013.01); *H04W 4/023* (2013.01); *H04W 4/80* (2018.02); *H04W 84/18* (2013.01)

(58) Field of Classification Search
CPC ......... H04W 4/21; H04W 4/021; H04W 4/80; H04W 4/023; H04W 84/18; H04W 4/08; H04W 4/50; H04W 8/005; H04W 40/00; H04W 40/02; H04W 40/246; H04W 40/248; H04W 4/029; H04W 4/06; H04W 84/042; H04W 84/10; H04W 84/22; H04W 88/04; H04W 88/06; H04W 8/186; H04W 24/00; G06Q 50/01; H04L 51/20; H04L 51/38; G06F 15/16

USPC .................. 370/338; 455/11.1, 410
See application file for complete search history.

(56) References Cited

U.S. PATENT DOCUMENTS

| 7,505,981 | B2 | 3/2009 | Pickover |
| 8,150,312 | B2 | 4/2012 | Bappu et al. |
| 9,173,245 | B2 | 10/2015 | Bill |
| 9,277,477 | B2 | 3/2016 | Leppanen et al. |
| 2004/0022221 | A1 | 2/2004 | Chwieseni et al. |
| 2006/0057079 | A1* | 3/2006 | Pickover .......... G16H 40/67 424/50 |
| 2009/0292814 | A1* | 11/2009 | Ting ................. H04L 51/32 709/229 |
| 2010/0070758 | A1 | 3/2010 | Low et al. |

(Continued)

OTHER PUBLICATIONS

Hu. et al., "A Survey on Mobile Social Networks: Applications, Platforms, System Architectures, and Future Research Directions" dated 2015, IEEE Communication Surveys & Tutorials, vol. 17, No. 3, Third Quarter, Total 25 pages.

(Continued)

*Primary Examiner* — Nathan S Taylor
(74) *Attorney, Agent, or Firm* — Konrad, Raynes, Davda and Victor LLP; Rabindranath Dutta (57) ABSTRACT

A first user of a first device transmits information to a second user of a second device located within a predetermined distance from the first device, wherein an ad-hoc network is formed from the first device and the second device. In response to determining that the information is likely to be of interest to other users, the information is propagated from the second user of the second device, to a third user of a third device within the predetermined distance from the second device, and the third device is included in the ad-hoc network.

17 Claims, 10 Drawing Sheets

(56) References Cited

U.S. PATENT DOCUMENTS

| | | | | |
|---|---|---|---|---|
| 2011/0238755 | A1* | 9/2011 | Khan | H04W 4/023 709/204 |
| 2012/0309417 | A1* | 12/2012 | Blom | H04L 51/20 455/456.1 |
| 2012/0316941 | A1* | 12/2012 | Moshfeghi | G06Q 30/02 705/14.16 |
| 2013/0091209 | A1* | 4/2013 | Bennett | G06Q 50/01 709/204 |
| 2013/0151608 | A1* | 6/2013 | Wiseman | H04L 67/22 709/204 |
| 2013/0170393 | A1* | 7/2013 | Bill | H04L 51/04 370/254 |
| 2013/0282819 | A1* | 10/2013 | Mehta | H04L 67/306 709/204 |
| 2014/0149507 | A1* | 5/2014 | Redfern | H04L 65/00 709/204 |
| 2014/0269514 | A1* | 9/2014 | Leppanen | H04W 4/21 370/328 |
| 2015/0106366 | A1* | 4/2015 | Stuttle | G06Q 50/01 707/732 |
| 2015/0271126 | A1* | 9/2015 | Menayas | H04L 51/20 709/206 |
| 2016/0180325 | A1* | 6/2016 | Davis | G06Q 20/325 705/44 |
| 2018/0131660 | A1* | 5/2018 | Lambert | G06Q 30/0202 |
| 2019/0273627 | A1* | 9/2019 | Whalin | G06Q 30/02 |

OTHER PUBLICATIONS

IBM, "An IP.com Prior Art Database Technical Disclosure", dated Oct. 16, 2007, for IP.com No. IPCOM000159275D, Total 4 pages.

Anonymous, "Method for Creating an Ad-Hoc Social Network Built Across Networked Devices", dated Nov. 8, 2011, for IP.com No. IPCOM000212372D, An IP.com Prior Art Database Technical Disclosure, Total 7 pages.

"Search Tweets" (online) retrieved from the Internet on Dec. 12, 2019 at URL>https://api.twitter.com/1.1/search/tweets.json, Total 14 pages.

Wikipedia, "Whisper" retrieved from the Internet onDec. 12, 2019 at URL>https://en.wikipedia.org/wiki/Whisper_(app), Total 10 pages.

Wikipedia, "Yik Yak" retrieved from the Internet on Dec. 12, 2019 at URL>https://en.wikipedia.org/wiki/Yik_Yak, Total 6 pages.

Wikipedia, "Geosocial Networking" retrieved from the Internet on Dec. 12, 2019 at URL>https://en.wikipedia.org/wiki/Geosocial_networking, Total 4 pages.

"Mapacha", retrieved from the Internet on Dec. 12, 2019 at URL>http://mapacha.net/geo-localized-social-network-web-version/, Total 2 pages.

"Location Based Social Networks Links" (online) retrieved from the Internet at URL>http://georillas.com/lbsn-location-based-social-networking-links/, on Jan. 15, 2020, Total 194 pages.

\* cited by examiner

PEER TO PEER PROPAGATION OF INFORMATION IN SOCIAL NETWORKS

BACKGROUND

1. Field

Embodiments relate to peer to peer propagation of information in social networks.

2. Background

A social networking service (also referred to as social networking site or social media) is an online platform for people to build social networks with other people who share something in common, such as similar personal or career interests, activities, backgrounds, etc.

The social networks may be distributed across a plurality of computer networks. The social networks may link people, organizations, or other entities. Social networking services vary in format and in the number of features. Such services may incorporate a range of new information and communication tools, and operate on desktops, laptops, tablet computers, smartphones, and other computing devices.

Social networking sites may allow users to share ideas, digital photos and videos, posts, and to inform others about online or real-world activities and events with people in their network. Depending on the social media platform, members may be able to contact any other member. In other cases, members can contact anyone they have a connection to, and subsequently anyone that contact has a connection to, and so on.

SUMMARY OF THE PREFERRED EMBODIMENTS

Provided are a method, a system, and a computer program product in which a first user of a first device transmits information to a second user of a second device located within a predetermined distance from the first device, wherein an ad-hoc network is formed from the first device and the second device. In response to determining that the information is likely to be of interest to other users, the information is propagated from the second user of the second device, to a third user of a third device within the predetermined distance from the second device, and the third device is included in the ad-hoc network.

In additional embodiments, the first device stores a first user profile indicating interests of the first user, wherein the second device stores a second user profile indicating interests of the second user, and wherein the third device stores a third user profile indicating interests of the third user.

In further embodiments, the predetermined distance from a device is a distance that corresponds to a range of a local wireless transmission signal.

In certain embodiments, the first user and the second user do not both belong to an existing social network. In response to posting by the first user of the first device, information to the existing social network, users of devices that are within the predetermined distance from the first device are notified of the information posted to the existing social network regardless of whether or not the users of the devices are on the existing social network.

In further embodiments, the users of the devices are notified of the posted information by using a software agent that execute as a background process on the devices, wherein the software agent polls social network geographical location providing interfaces to discover a new post within a predetermined range of a device on which the software agent executes.

In certain embodiments, the ad-hoc network spans devices of users located in a plurality of local areas.

In further embodiments, a post is rebroadcasted, in response to determining that the post meets a threshold level of user interest.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Social networks are immensely popular, connecting people from all over the world for hours on end every day. Certain social networks work by connecting people via friendships or by allowing people to "follow" one another. However, one area where current social networks are lacking is in the propagation of local information. There remains a great deal of useful information that is missed if one is not following the right people or friends at the right time. While some social accounts and pages exist to provide local news, they fail to capture the enormous amount of user generated content that could be extremely useful within a local area populated by people that may not otherwise be connected with each other.

Certain embodiments provide a mechanism to connect people within a local area in order to propagate useful information, even if the people are not otherwise connected via existing social networks. How the information propagates is determined by the makeup of the group and the reaction of people to the information. If the information is relevant and useful enough, it will continue to propagate to other nearby users, potentially spreading out to a wide area. In this way a user may receive relevant and useful information automatically without having to worry about which social networks they belong to, who their friends are, or which news pages are controlling local information. As a result improvements are made to computational devices that allow users to interact with social networks.

Exemplary Embodiments

Figure 1:
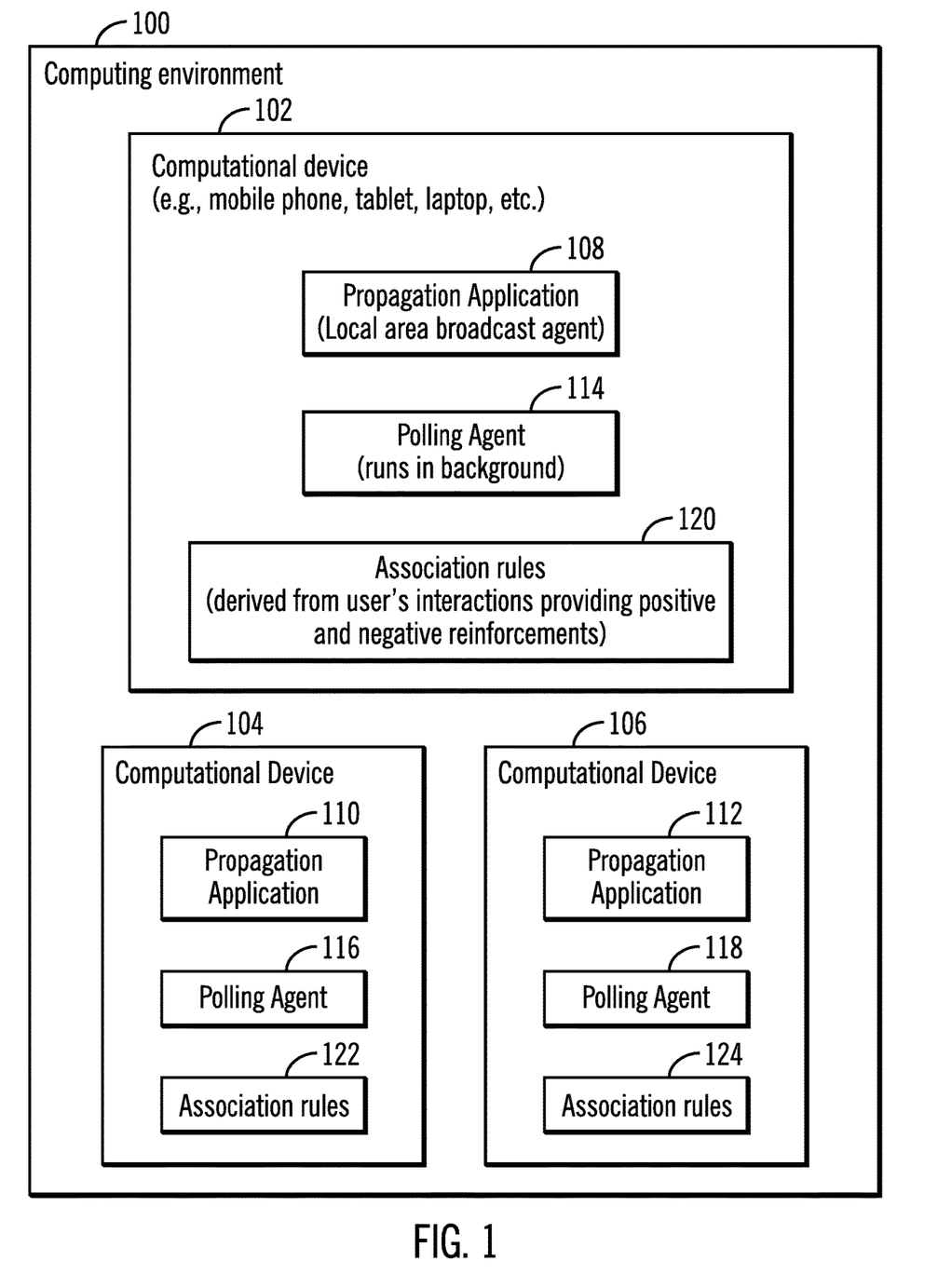
FIG. 1 illustrates a block diagram of a computing environment comprising a plurality of computational devices distributed in a plurality of local areas, in accordance with certain embodiments.

FIG. 1 illustrates a block diagram of a computing environment 100 comprising a plurality of computational devices 102, 104, 106 distributed in a plurality of local areas, in accordance with certain embodiments. While three computational devices are shown in FIG. 1, the number of computational devices may be in hundreds, thousands or many more.

Each of the computational devices 102, 104, 106 may be any suitable computational device presently known in the art, such a mobile phone, a tablet a laptop, a personal computer, a workstation, a server, a mainframe, a handheld computer, a telephony device, a network appliance, etc. The computational devices 102, 104, 106 may be included in one or more suitable networks, such as, a local area network, a storage area network, a wide area network, the Internet, an intranet, etc. In certain embodiments, the computational devices may be included in a cloud computing environment, In certain embodiments, the computation devices 102, 104, 106 may communicate via wireless transmission mechanisms including those provided by WiFi or Bluetooth.

Each of the computational devices 102, 104, 106 includes a propagation application 108, 110, 112, a polling agent 114, 116, 118, and association rules 120, 122, 124. The propagation application comprises a local area broadcast agent. The polling agent is a background process. The association rules are learning based rules that are derived from interactions of users with social networks via positive and negative reinforcements.

Figure 2:
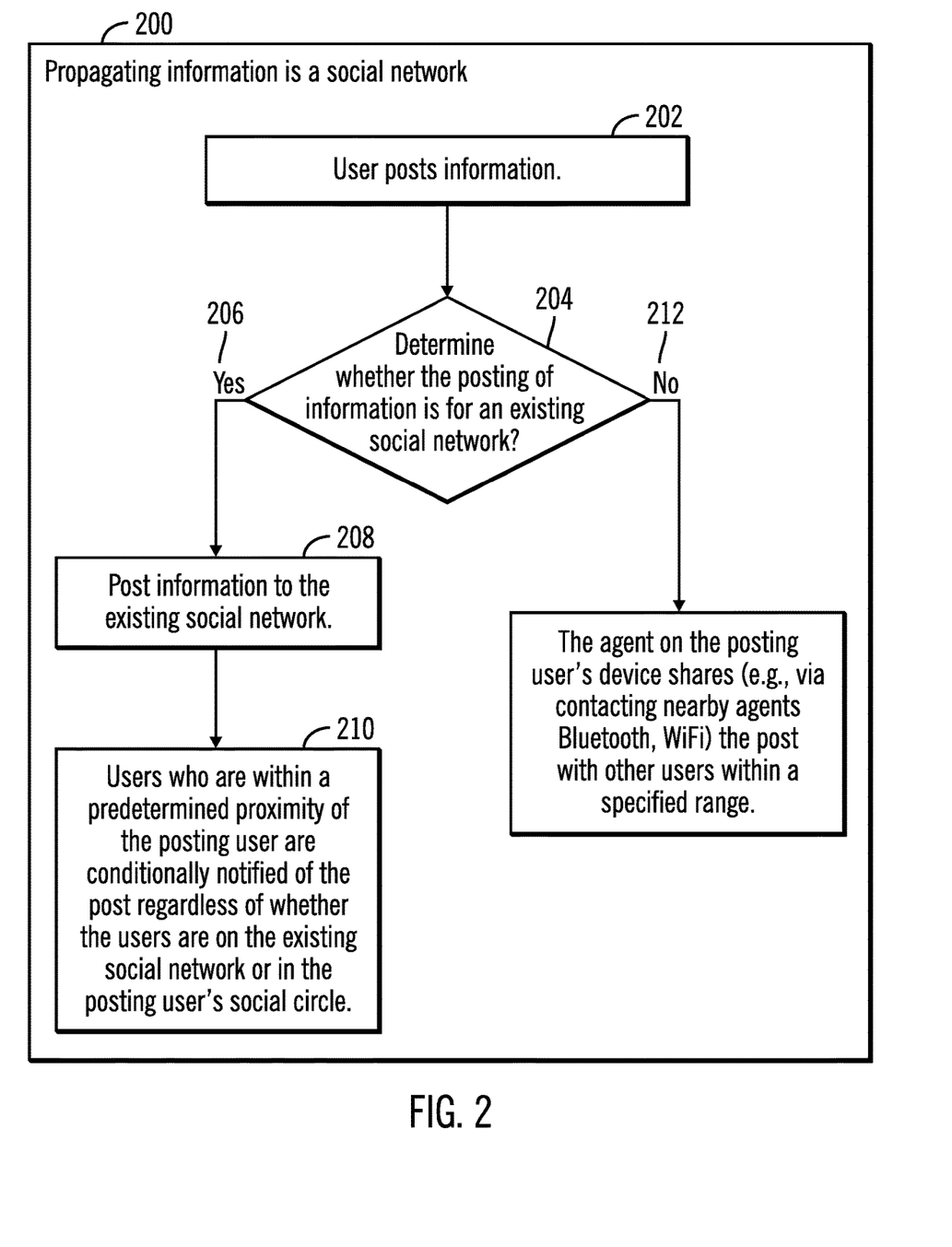
FIG. 2 illustrates a flowchart for propagating information in social networks, in accordance with certain embodiments.

FIG. 2 illustrates a flowchart 200 for propagating information in social networks, in accordance with certain embodiments.

Control starts at block 202 in which a user of a computational device 102 posts information. The information may include text, picture, a video, etc. The user may post this information via an existing social network. However, if the user in not on any social network, the user may post the information via the propagation application 108.

From block 202 control proceeds to block 204 in which a determination is made as to whether the information is for an existing social network. If so ("Yes" branch 206) control proceeds to block 208 in which the information is posted on the existing social network.

Users who are within a predetermined proximity of the posting user are conditionally notified (at block 210) of the post regardless of whether the users are on the existing social network or in the posting user's social circle. This is accomplished using a software agent (e.g., polling agents 116, 118) that runs on the mobile devices of other users in the area. This agents run automatically in the background, polling social network geographical location determining interfaces to discover new posts within a specified range of a user's current location.

If the posting user is not on an existing social network ("No" branch 212), then the posting user's device shares the post with other users within a specified range. In such embodiments, agents contacts other nearby agents using technology such as Bluetooth or WiFi.

Figure 3:
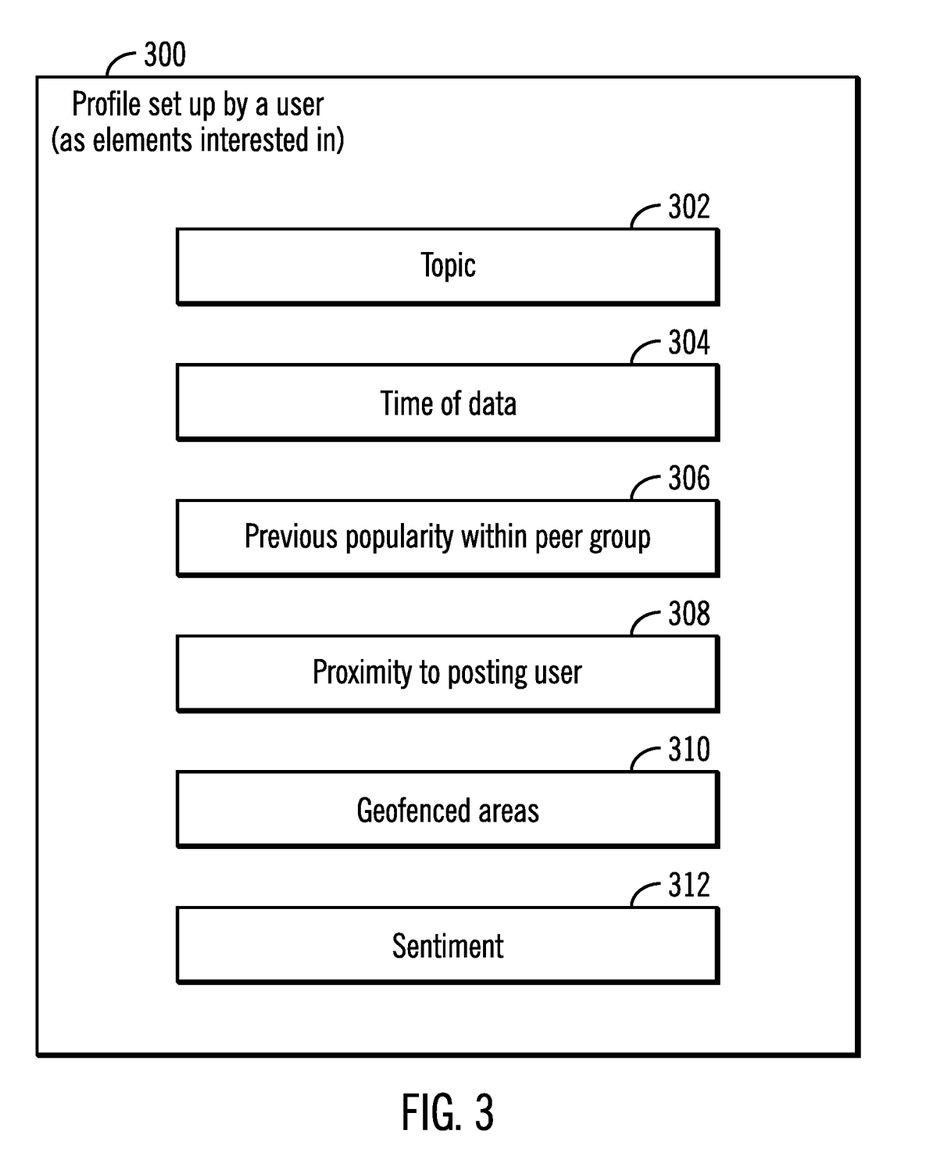
FIG. 3 illustrates a block diagram of profiles set up by a user, in accordance with certain embodiments.

FIG. 3 illustrates a block diagram 300 of a profile set up by a user, in accordance with certain embodiments.

The profile indicates which type of information the user most interested in. This may include elements such as topic 302, time of day 304, previous popularity within the peer group 306, proximity to posting user 308, geofenced areas 310, sentiment 312, etc.

Figure 4:
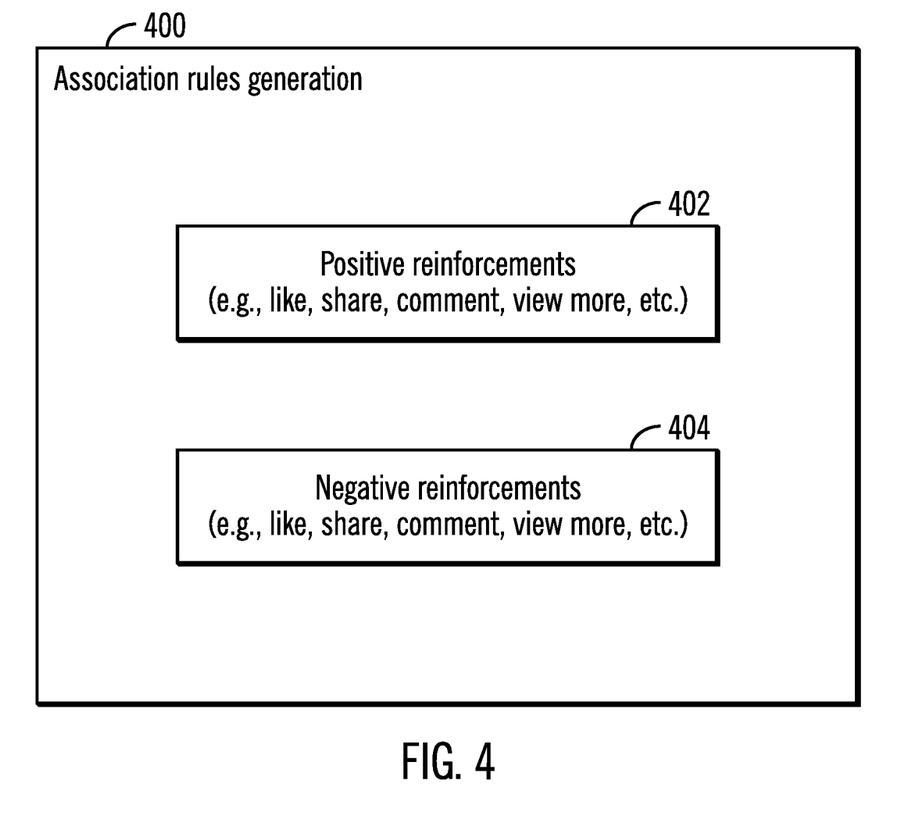
FIG. 4 illustrates a block diagram that shows factors based on which association rules are generated, in accordance with certain embodiments.

FIG. 4 illustrates a block diagram 400 that shows factors based on which association rules are generated, in accordance with certain embodiments.

Over time, certain embodiments implement generation of association rules based on a user's interactions. For example, a like, share, comment, view more, etc., serves as positive reinforcement 402 for a post, whereas a quick dismissal, angry expression, or not opening a post serves as negative reinforcement 404.

Figure 5:
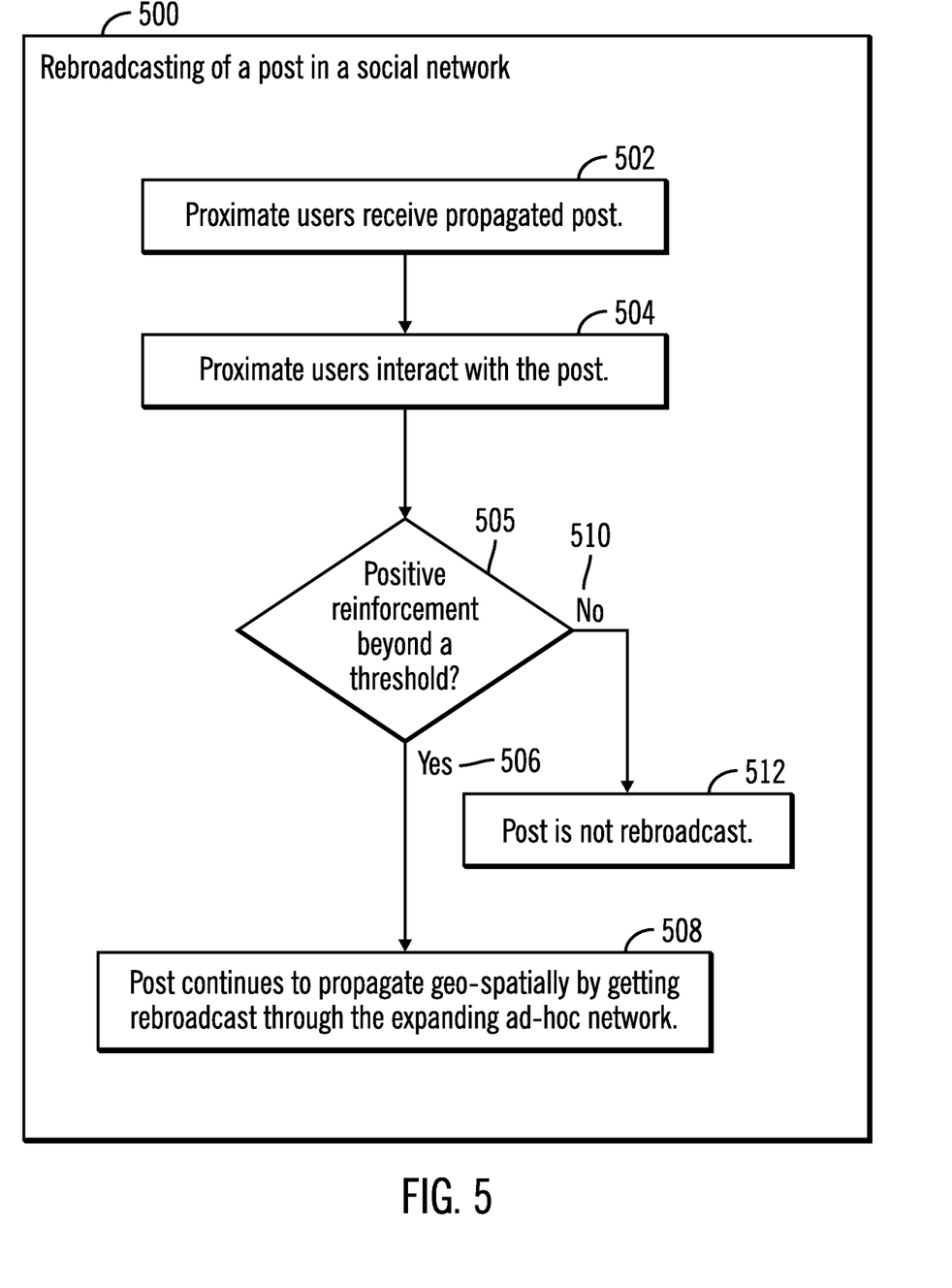
FIG. 5 illustrates a flowchart that shows rebroadcasting of a post in a social network, in accordance with certain embodiments.

FIG. 5 illustrates a flowchart that shows rebroadcasting of a post in a social network, in accordance with certain embodiments.

When co-located (i.e., proximate or in the same local area) users receive the post (at block 502), they may interact (at block 504) with the post in much the same way as they would on a social network site. Users may like, share, comment, ignore or perform other operations on the post. If the post receives enough positive reinforcement (defined via a threshold), then the post will continue to propagate geospatially by getting re-broadcast through the expanding ad-hoc network (as shown via reference numerals 505, 506, 508). This allows useful information to continue to be propagated.

If the positive reinforcement is not beyond the threshold ("No" branch 510) then the post is not rebroadcasted and as a result less useful information is discontinued from propagation.

Figure 6:
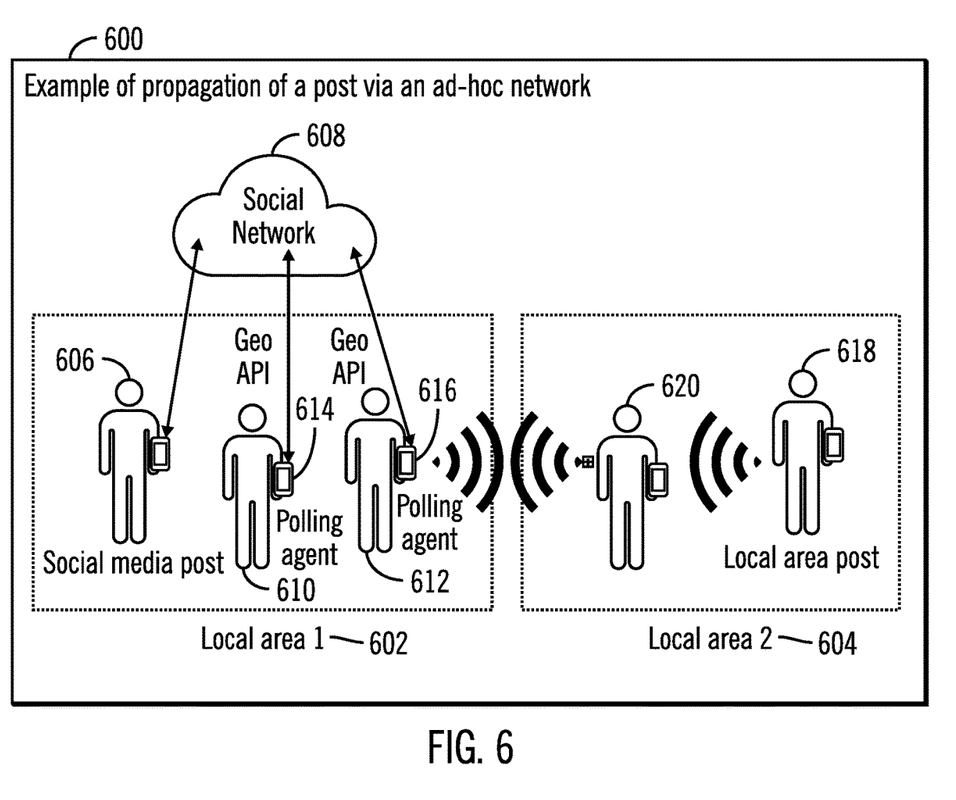
FIG. 6 illustrates a block diagram that shows an example of propagation of a post via an ad-hoc network, in accordance with certain embodiments.

FIG. 6 illustrates a block diagram 600 that shows an example of propagation of a post via an ad-hoc network, in accordance with certain embodiments.

FIG. 6 shows two different local areas 602, 604. The user 606 on the left has just posted information to a social network 608. He has posted a picture of a funnel cloud from the parking lot of his office. The two other users 610, 612 in Local area 602 are made aware of the post via polling agents 614, 616. The users' 610, 612 profile and previous interactions indicate that they are interested in severe weather, and so each user 610, 612 receives the post. Based on their reactions to the picture, the post gets propagated, eventually crossing over into local area 604.

The user 618 on the right in Local area 604 is not on a social network, but has just been to the cafeteria and posted about the delicious pasta salad via the local area broadcast agent. The other user 620 in Local area 604 likes being notified about cafeteria food between 11 AM and 1 PM, and so he reacts positively to the information. The post about the pasta salad eventually propagates into local area 602. Since the cafeteria is only relevant to employees of the office building, the pasta salad post is not likely to propagate as far as the funnel cloud post, which may affect a wider local area.

Figure 7:
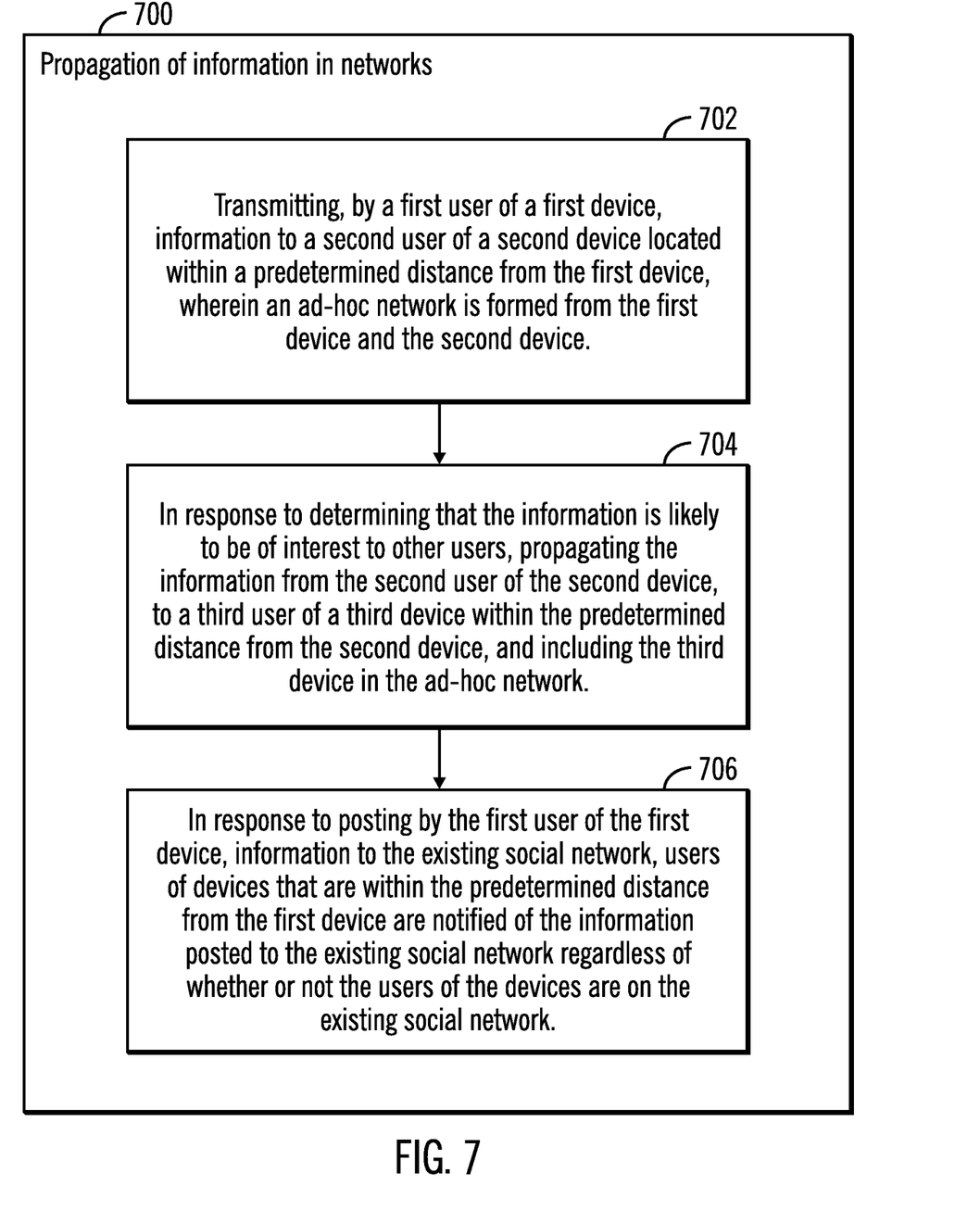
FIG. 7 illustrates a flowchart for propagating information in networks, in accordance with certain embodiments.

FIG. 7 illustrates a flowchart 700 for propagating information in networks, in accordance with certain embodiments.

Control starts at block 702 in which a first user of a first device transmits information to a second user of a second device located within a predetermined distance from the first device, wherein an ad-hoc network is formed from the first device and the second device. The first user and the second user may or may not both belong to the same social network From block 702 control proceeds to block 704 in which in response to determining that the information is likely to be of interest to other users, the information is propagated from the second user of the second device, to a third user of a third device within the predetermined distance from the second device, and the third device is included in the ad-hoc network.

In response to posting by the first user of the first device, information to the existing social network, users of devices that are within the predetermined distance from the first device are notified (at block 706) of the information posted to the existing social network regardless of whether or not the users of the devices are on the existing social network.

Therefore, FIGS. 1-7 illustrate embodiments for propagating information via ad-hoc networks in a social networking environment to cause improvements in the operations of one or more computing devices that implement social networks.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
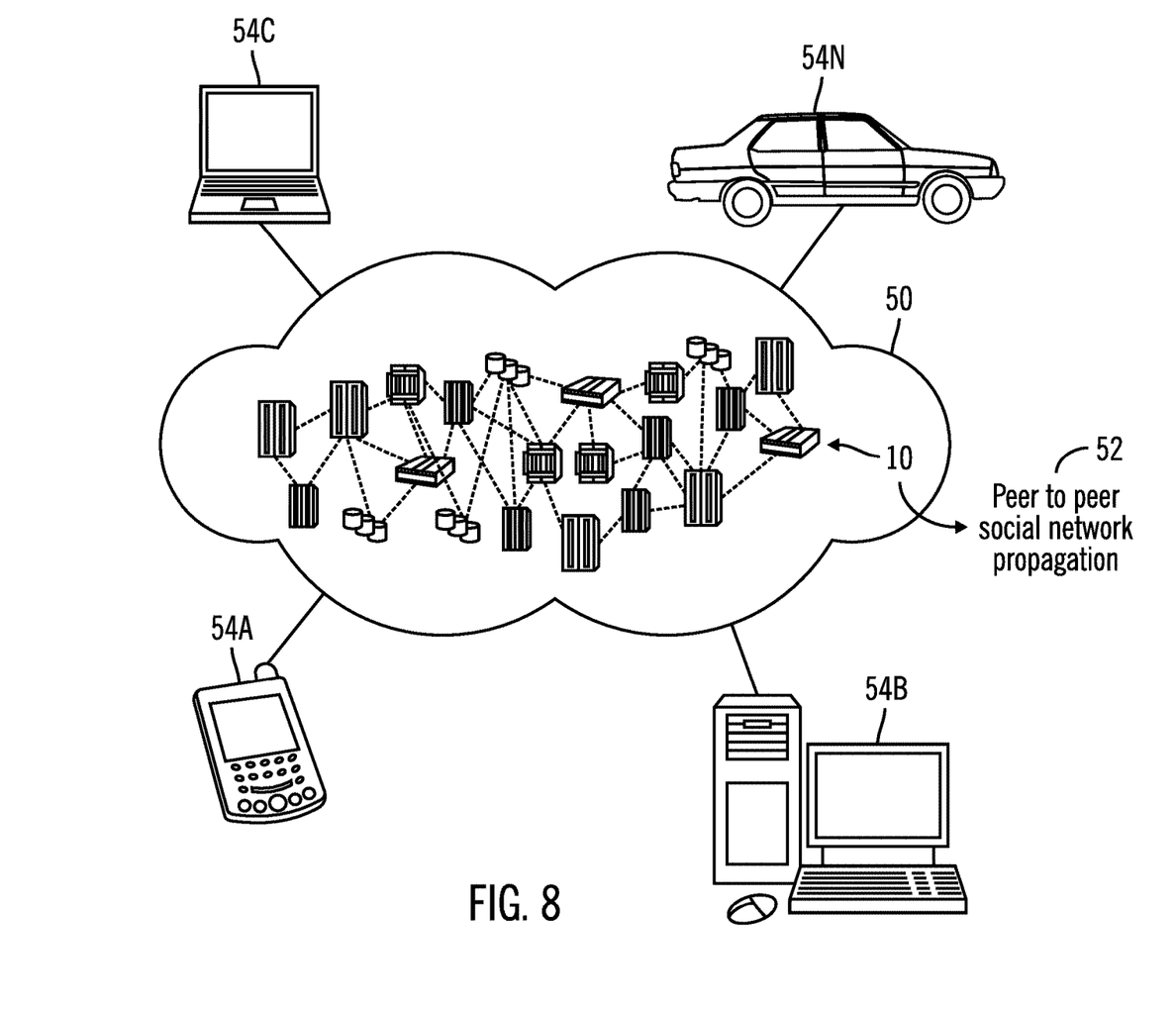
FIG. 8 illustrates a block diagram of a cloud computing environment, in accordance with certain embodiments.

Referring now to FIG. 8 an illustrative cloud computing environment 50 is depicted. Peer to peer social network propagation (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
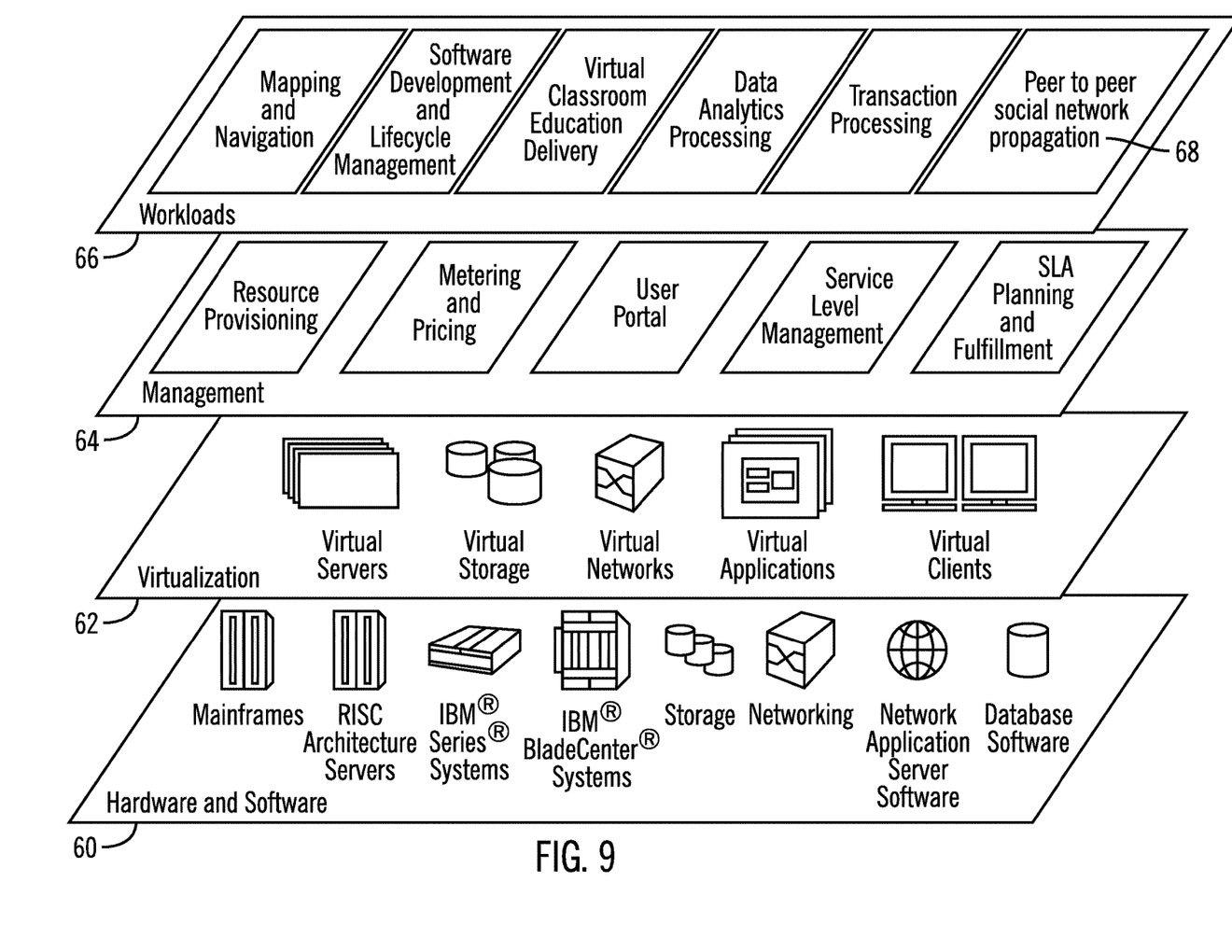
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM SERIES* systems; RISC (Reduced Instruction Set Computer) architecture based servers, in one example IBM PSERIES* systems; IBM XSERIES* systems; IBM BLADECENTER* systems; storage devices; networks and networking components. Examples of software components include network application server software, in one example IBM WEBSPHERE* application server software; and database software, in one example IBM DB2* database software.

* IBM, ZSERIES, PSERIES, XSERIES, BLADECENTER, WEBSPHERE, and DB2 are trademarks or registered trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and peer to peer social network propagation 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
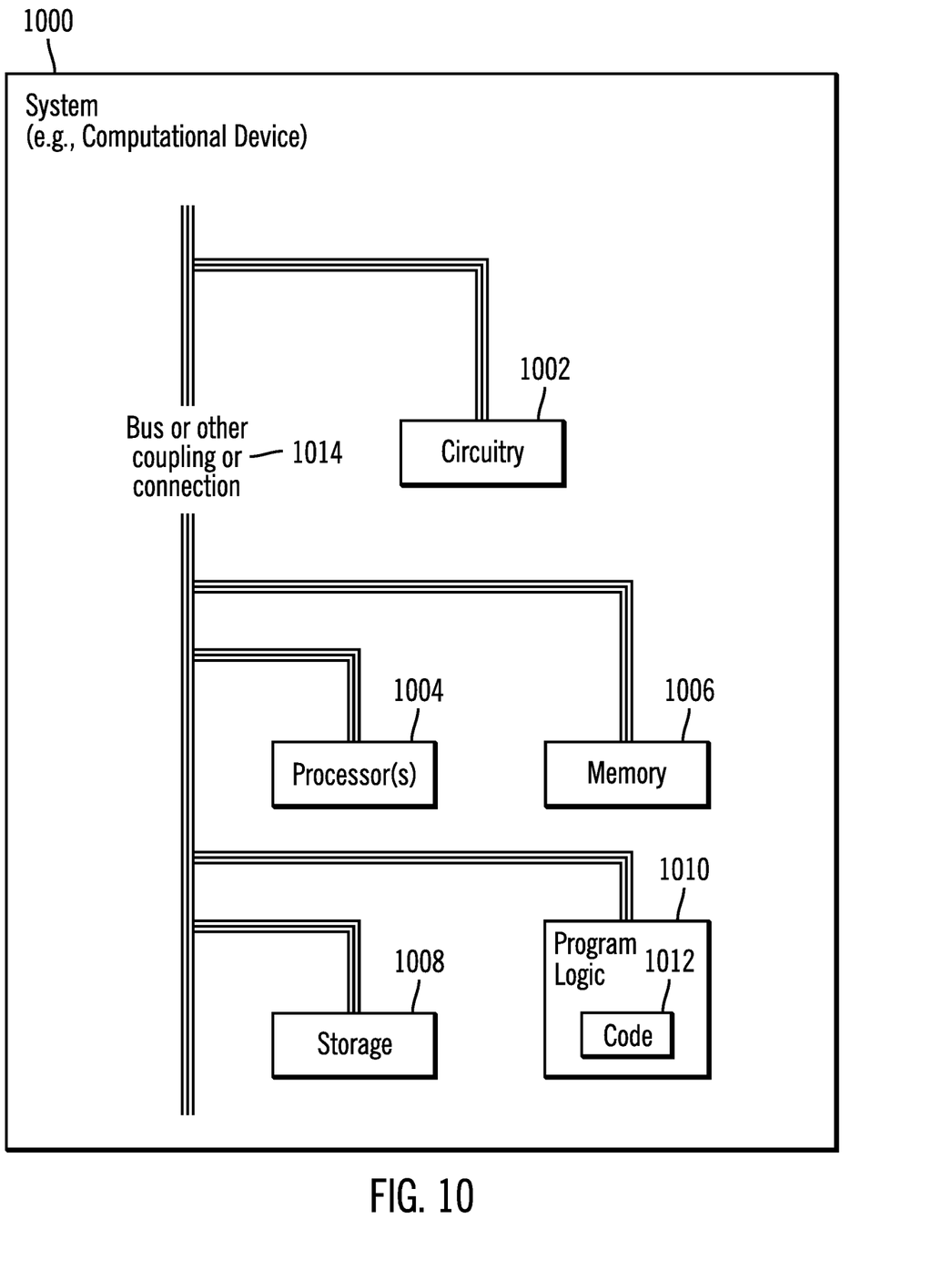
FIG. 10 illustrates a block diagram of a computational system that shows certain elements that may be included in a computational device, as described in FIGS. 1-9, in accordance with certain embodiments.

FIG. 10 illustrates a block diagram that shows certain elements that may be included in the computational device 102, 104, 106 or other devices shown in FIGS. 1-9, in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

transmitting, by a first user of a first device, information to a second user of a second device located within a predetermined distance from the first device, wherein an ad-hoc network is formed from the first device and the second device; and in response to determining that the information is likely to be of interest to other users, propagating the information from the second user of the second device, to a third user of a third device within the predetermined distance from the second device, and including the third device in the ad-hoc network, wherein the propagating of the information is based on:

determining whether a positive reinforcement exceeds a threshold, wherein the positive reinforcement includes likes, shares and comments on the information;

in response to determining that the positive reinforcement exceeds the threshold, continuing to propagate the information by rebroadcasting the information in the ad-hoc network that keeps expanding; and in response to determining that the positive reinforcement does not exceed the threshold, avoiding rebroadcasting the information in the ad-hoc network, wherein the first user and the second user do not both belong to an existing social network, and wherein in response to posting by the first user of the first device, information to the existing social network, users of devices that are within the predetermined distance from the first device are notified of the information posted to the existing social network regardless of whether or not the users of the devices are on the existing social network.

2. The method of claim 1, wherein the first device stores a first user profile indicating interests of the first user, wherein the second device stores a second user profile indicating interests of the second user, and wherein the third device stores a third user profile indicating interests of the third user.

3. The method of claim 2, wherein the predetermined distance from a device is a distance that corresponds to a range of a local wireless transmission signal.

4. The method of claim 1, wherein the users of the devices are notified of the posted information by using a software agent that execute as a background process on the devices, wherein the software agent polls social network geographical location providing interfaces to discover a new post within a predetermined range of a device on which the software agent executes.

5. The method of claim 1, wherein the ad-hoc network spans devices of users located in a plurality of local areas.

6. The method of claim 5, wherein a post is rebroadcasted, in response to determining that the post meets a threshold level of user interest.

7. A system, comprising:
a memory; and
a processor coupled to the memory, wherein the processor performs operations, the operations comprising:
transmitting, by a first user of a first device, information to a second user of a second device located within a predetermined distance from the first device, wherein an ad-hoc network is formed from the first device and the second device; and
in response to determining that the information is likely to be of interest to other users, propagating the information from the second user of the second device, to a third user of a third device within the predetermined distance from the second device, and including the third device in the ad-hoc network, wherein the propagating of the information is based on:
determining whether a positive reinforcement exceeds a threshold, wherein the positive reinforcement includes likes, shares and comments on the information;
in response to determining that the positive reinforcement exceeds the threshold, continuing to propagate the information by rebroadcasting the information in the ad-hoc network that keeps expanding; and
in response to determining that the positive reinforcement does not exceed the threshold, avoiding rebroadcasting the information in the ad-hoc network, wherein the first user and the second user do not both belong to an existing social network, and wherein in response to posting by the first user of the first device, information to the existing social network, users of devices that are within the predetermined distance from the first device are notified of the information posted to the existing social network regardless of whether or not the users of the devices are on the existing social network.

8. The system of claim 7, wherein the first device stores a first user profile indicating interests of the first user, wherein the second device stores a second user profile indicating interests of the second user, and wherein the third device stores a third user profile indicating interests of the third user.

9. The system of claim 8, wherein the predetermined distance from a device is a distance that corresponds to a range of a local wireless transmission signal.

10. The system of claim 7, wherein the users of the devices are notified of the posted information by using a software agent that execute as a background process on the devices, wherein the software agent polls social network geographical location providing interfaces to discover a new post within a predetermined range of a device on which the software agent executes.

11. The system of claim 7, wherein the ad-hoc network spans devices of users located in a plurality of local areas.

12. The system of claim 11, wherein a post is rebroadcasted, in response to determining that the post meets a threshold level of user interest.

13. A computer program product, the computer program product comprising a computer readable storage medium having computer readable program code embodied therewith, the computer readable program code configured to perform operations via a processor, the operations comprising:
transmitting, by a first user of a first device, information to a second user of a second device located within a predetermined distance from the first device, wherein an ad-hoc network is formed from the first device and the second device; and
in response to determining that the information is likely to be of interest to other users, propagating the information from the second user of the second device, to a third user of a third device within the predetermined distance from the second device, and including the third device in the ad-hoc network, wherein the propagating of the information is based on:
determining whether a positive reinforcement exceeds a threshold, wherein the positive reinforcement includes likes, shares and comments on the information;
in response to determining that the positive reinforcement exceeds the threshold, continuing to propagate the information by rebroadcasting the information in the ad-hoc network that keeps expanding; and
in response to determining that the positive reinforcement does not exceed the threshold, avoiding rebroadcasting the information in the ad-hoc network, wherein the first user and the second user do not both belong to an existing social network, and wherein in response to posting by the first user of the first device, information to the existing social network, users of devices that are within the predetermined distance from the first device are notified of the information posted to the existing social network regardless of whether or not the users of the devices are on the existing social network.

14. The computer program product of claim 13, wherein the first device stores a first user profile indicating interests of the first user, wherein the second device stores a second user profile indicating interests of the second user, and wherein the third device stores a third user profile indicating interests of the third user.

15. The computer program product of claim 14, wherein the predetermined distance from a device is a distance that corresponds to a range of a local wireless transmission signal.

16. The computer program product of claim 13, wherein the users of the devices are notified of the posted information by using a software agent that execute as a background process on the devices, wherein the software agent polls social network geographical location providing interfaces to discover a new post within a predetermined range of a device on which the software agent executes.

17. The computer program product of claim 13, wherein the ad-hoc network spans devices of users located in a plurality of local areas.

* * * * *